April 4, 1967         A. C. MUELLER         3,312,412
                      FILM CONTAINER
Filed Feb. 17, 1964                    2 Sheets-Sheet 1
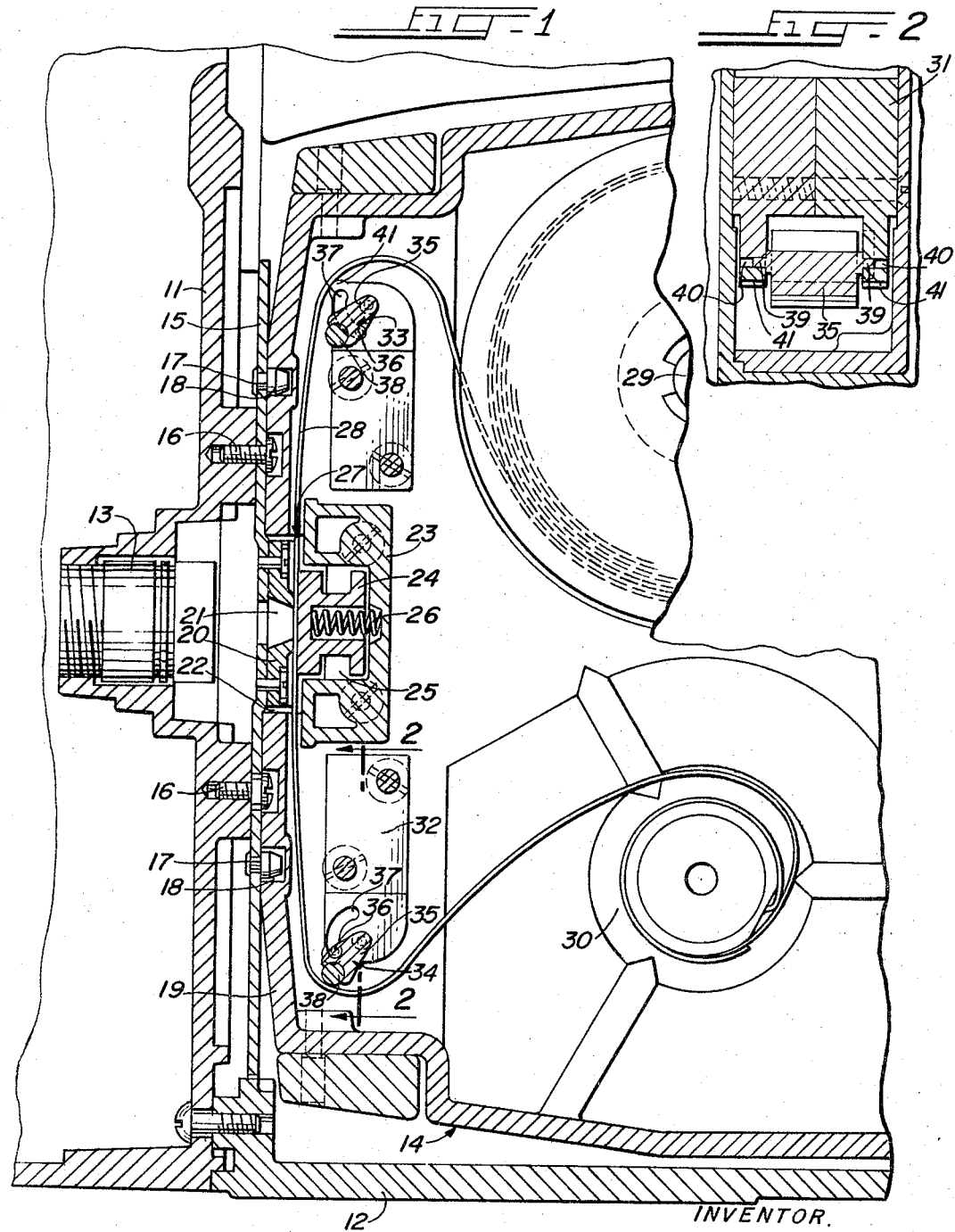
INVENTOR.
ARTHUR C. MUELLER
BY Barry L. Clark
ATTY

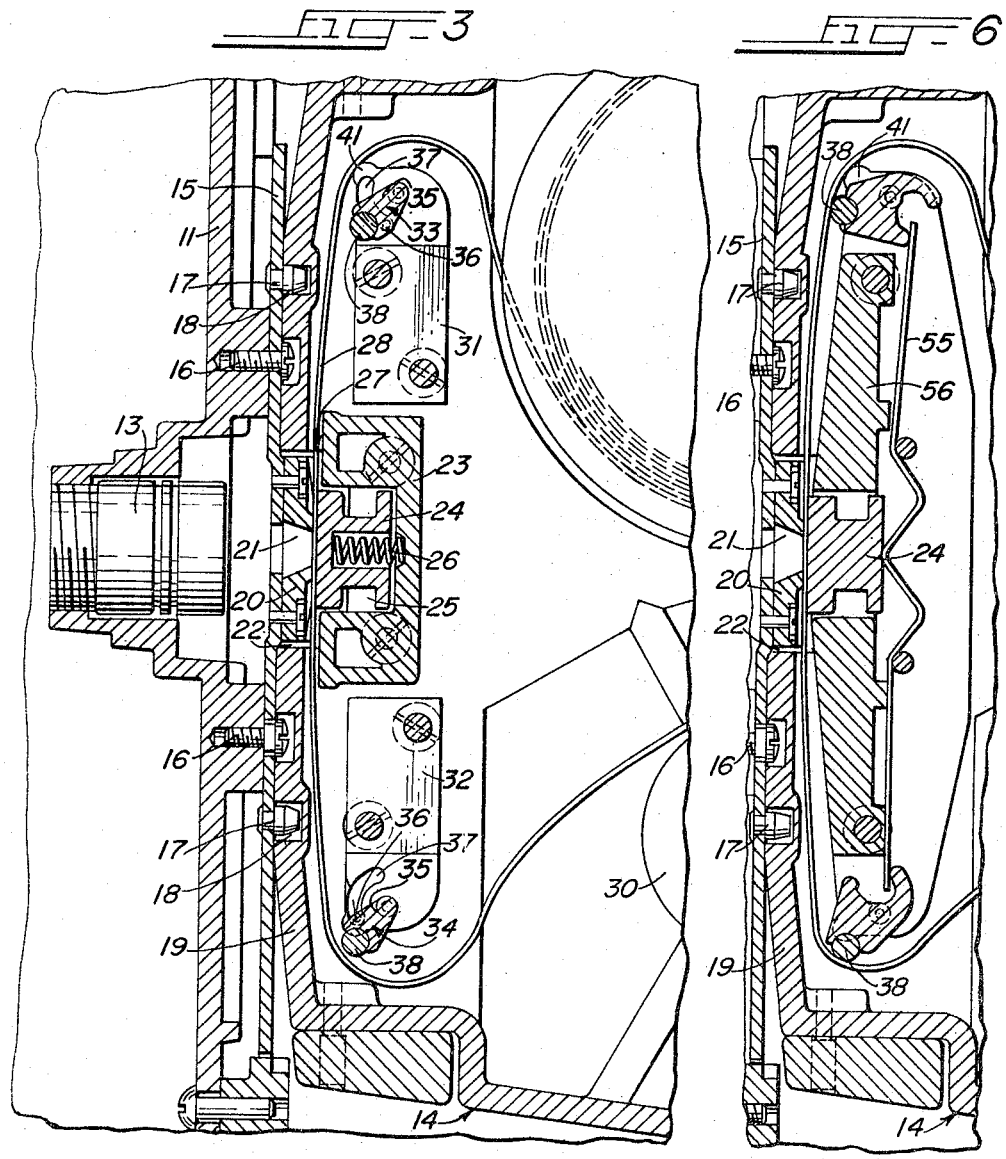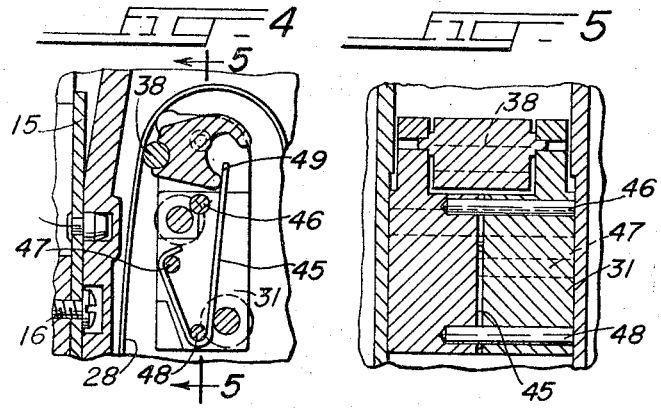

United States Patent Office 3,312,412
Patented Apr. 4, 1967

3,312,412
FILM CONTAINER
Arthur C. Mueller, Niles, Ill., assignor to Bell & Howell
Company, Chicago, Ill., a corporation of Illinois
Filed Feb. 17, 1964, Ser. No. 345,179
3 Claims. (Cl. 242—71.2)

My invention relates to improvements in film containers, particularly reversible film containers for use in motion picture cameras.

In conventional motion picture cameras, film is transported from a supply spindle to an exposure gate and, after having been exposed, from the exposure gate to a take-up spindle. Conventionally, the exposure gate comprises a plate containing an exposure aperture and a spring biased pressure shoe which provides a light pressure on the film in the exposure gate. This pressure does not hamper film movement through the gate, but does hold the film flat and motionless at the exposure aperture to insure proper exposure. An intermittent film transport system is employed to move the film through the film gate, the actual film advancement being mechanically timed to occur between exposure periods. The take-up spindle, which is typically driven at a substantially continuous rotational speed, gathers the exposed film. Because the continuous take-up drive would normally tend to overcome the light holding force exerted on the film by the pressure plate thereby moving the film during exposure, a device is conventionally provided in the film path between the exposure gate exit and the film take-up spindle to prevent undesirable film movement. Commonly called snubbers, one of these devices is conventionally supplied to contact the film when the film is pulled taut by the film take-up drive, and thereby hold the film securely, thus preventing film movement in the exposure gate during exposure. A slip clutch is conventionally supplied in the take-up drive to permit the take-up spindle to remain motionless while the film is being snubbed.

In an ordinary motion picture camera, a snubber may be permanently positioned between the exposure gate exit and the take-up spindle. In a reversible film container, however, adapted for use with conventional 8 mm. film, in which only one longitudinal half of the film is exposed at a particular time, the snubber cannot be fixed, for to expose both halves of a roll of film, the film container must be reversed to expose the second half roll. The snubber would then be located between the supply spindle and the entrance to the exposure gate during the second half exposure. In this mode of operation, the snubber would resist the motion of the film advancing from the supply spindle to the entrance of the exposure gate to the detriment of resulting picture quality. In fact, if the snubbing action is highly efficient, the intermittent film transport might not have sufficient power to override the snubbing action, and the film would be damaged and might not even be advanced at all.

It is, therefore, an object of my invention to provide a reversible snubbing system for motion picture cameras.

Another object of my invention is to provide a reversible snubbing system for reversible film containers used in motion picture cameras.

Yet another object of my invention is to provide a reversible snubbing system for reversible motion picture film containers that will have a plurality of snubbers, each with an active and inactive mode of operation, that will each automatically move to the proper mode of operation as determined by the direction of film travel.

A further object of my invention is to provide a movable snubber for a reversible motion picture film container that will provide effective snubbing action when the container is positioned so that the snubber is between the exposure gate and the film take-up spindle, and will move to an inoperative position so as not to impede film movement when the container is positioned so that the snubber is between the film supply spindle and the exposure gate entrance.

An even further object of my invention is to provide a snubber for a reversible motion picture film container that will be movable between an active and inactive operating position dependent upon frictional contact with the film and the film's direction of travel.

To accomplish these objectives, I have provided an improved snubbing system for a reversible motion picture film container. An exemplary embodiment of such a container is described as a part of co-pending applications, U.S. Ser. No. 175,034 filed Feb. 23, 1962, now U.S. Patent No. 3,145,613, and U.S. Ser. No. 259,961 filed Feb. 20, 1963, now U.S. Patent No. 3,201,798, both assigned to the same assignee as this application. This and similar containers are designed for the exposure of standard 8 mm. rolls of amateur motion picture film in combination with cameras of suitable cooperating design, and generally includes a casing, openable by the user for film loading, and a film handling system with film supply and take-up spindles and a spring biased pressure shoe positioned therebetween. For use, the film is manually threaded from the film supply spindle past the pressure shoe to the film take-up spindle.

I have provided a pair of movable snubbers, mounted at each end of the exposure gate. In the position between the film supply spindle and the exposure gate, the snubber will automatically move out of the film path leaving the film to contact a pair of film guides which will permit the film to move freely from the supply spindle into the exposure gate. In the position between the exposure gate and the take-up spindle, the snubber moves into the film path to contact the film and to provide a frictional snubbing action on the film. When the cartridge is reversed, the initial position and function of the two snubbers is reversed, and the snubbers will automatically rotate to an opposite operational position.

A complete understanding of my invention may be obtained from the following detailed description when read with reference to the accompanying drawings in which:

FIGURE 1 is a partial section through a motion picture camera, in combination with a cartridge embodying the invention, showing the motion picture film in a taut or snubbed position between the lower snubber and the lower or take-up spool;

FIGURE 2 is a section taken along line 2—2, of FIGURE 1 showing a preferred embodiment of the pivotal snubber;

FIGURE 3 is a partial section through a motion picture camera and cartridge combination similar to FIGURE 1, but showing the motion picture film in a relaxed position around the lower snubber;

FIGURE 4 is a partial section of the upper snubber position, showing an alternate embodiment of the invention;

FIGURE 5 is a section view taken along line 5—5 of FIGURE 4; and

FIGURE 6 is a partial section through a motion picture camera and cartridge combination showing another alternate embodiment of the invention.

Referring to FIGURE 1, a preferred embodiment of my invention is shown in a camera having outer walls 11 and 12 and a lens barrel 13 containing a film cartridge 14 removably mounted in operating position therein. The front wall of the camera has an inner plate 15 secured thereto by bolts 16. Riveted to the plate 15 are locating pins 17, which protrude in the direction of the cartridge, and which enter recessed sockets 18 formed in the front wall 19 of the cartridge for accurately locating the cartridge within the camera. Also mounted to the inner camera plate 15 is a block 20 containing an exposure aperture 21 which is centered on the optical axis of the lens barrel 13.

An opening 22 in the front wall 19 of the cartridge will accept the aperture block 20 when the cartridge is properly positioned within the camera. Immediately behind this opening, and within the cartridge is a mounting block 23 for the film pressure shoe 24. A well 25 within the mounting block 23 receives the pressure shoe 24 which is spring biased outwardly from the well by a light spring 26. The pressure shoe 24 and the aperture block 20 in combination, form an exposure gate 27 through which the film 28 is transported during exposure. An intermittent drive to the film, mechanically synchronized with the movement of the camera shutter (not shown), is provided by a shuttle (not shown) to move the film through this exposure gate. The pressure provided by the spring biased pressure shoe 24 insures that the film within the exposure gate will be held flat and snugly against the rear surface of the aperture block 20 to insure proper exposure, but this spring pressure provides no substantial restraining force to the movement of the film through the exposure gate.

The cartridge has a conventional film handling arrangement with a film supply spindle 29 and a film take-up spindle 30. Generally, the film is transported from the supply spindle 29, through the exposure gate 27, to the take-up spindle 30. The motive force for the film transport system is supplied by a motor (not shown), contained within the camera. The drive motor transmits power to the intermittent shuttle and to the cartridge take-up spindle in a conventional manner, well known to those skilled in the art.

Carried by the cartridge casing, and positioned at opposite ends of the exposure gate and in the film path, located respectively between the exposure gate and the supply spindle and the exposure gate and the take-up spindle, I have supplied two snubber mounting blocks 31 and 32, each carrying a movable snubber 33 and 34. In a preferred embodiment, the snubbers each comprise a rigid body member 35, pivotally co-operable with its respective mounting block to permit free rotation between an operable or active position and inoperable or inactive position with respect to the film, as limited by a stud 36, which may be carried by the body member, and moving in a slot 37 in the mounting block, and a snubbing cap 38 of a frictional material carried by the body member, which contacts and holds the film when the snubber is in its operable position. In FIGURE 2, I have shown the snubber, fabricated as a molded part with studs 39 that extend into bearing holes 40 carried by the parts of the mounting block. I do not, however, intend to restrict my invention to this particular form of bearing or to the illustrated rotation limiting stud and slot structure.

FIGURES 1 and 3 illustrates the positioning of a pair of snubbers during the handling of a roll of film. The snubber 33 positioned in the film path between the supply spindle 29 and the film gate 27, has been rotated in this particular embodiment, by frictional contact with the film and by gravity, toward the film gate so that the snubbing cap 38 has been moved out of contact with the film.

To minimize film-snubber contact the film may ride on raised projections 41 on the mounting block, which act as film guides and, as parts of the snubber mounting block, straddle the snubber as shown in FIGURE 2 and prevent film-snubber contact when the snubber is in an inoperable position. The snubber mounting block is preferably made of a material over which the film will slide freely, so that the film movement as effected by the intermittent shuttle, will not be hampered by the contact between the film and the mounting block.

During the exposure period, the film should be motionless in the exposure gate. Since the film is being gathered on the take-up spindle at essentially a constant rate, the film will be tightly drawn about the lower snubber 34 which is, in my illustrated embodiment, located between the exposure gate and the take-up spindle (as shown in FIGURE 1). Frictional contact between the film and the snubbing cap, coupled with the force of gravity has caused a counterclockwise rotation of the lower snubber. The stud 36 carried by the snubber has come into contact with the end of the slot 37 preventing any further rotation of the snubber. In this position, as the film is tightly drawn around the snubber cap 38, the friction between the snubber and the film holds the film and prevents unwanted film movement in the exposure aperture. When the period of exposure has been completed, the shuttle will advance the film, forming (as shown in FIGURE 3) a film loop which is large enough to evade contact with the snubber thereby permitting the film to be freely gathered on the take-up spindle 30.

After exposing one half the film, the cartridge is conventionally removed from the camera, flipped over, end for end on itself, and returned to the camera for exposure of the second half of the film. With the cartridge in this reversed position, the direction of film travel with respect to the cartridge and the snubbers is also reversed. For proper film handling, therefore, the snubbers must also reverse, and move from an operable to an inoperable position, and from an inoperable to an operable position respectively. In the embodiment illustrated in FIGURES 1 and 2, as previously mentioned, this snubber movement is accomplished by frictional contact between the film and the snubber cap, assisted by the force of gravity.

Other methods of automatic snubber movement are possible. By way of example, two alternate embodiments are illustrated in FIGURES 4, 5 and 6. A wire spring 45 may be provided, carried by the snubber mounting block, as shown in FIGURE 4, to aid in rotating the snubber. As illustrated in FIGURES 4 and 5, the spring 45 may be carried by the snubber mounting block, and positioned by pins 46, 47 and 48. The active end 49 of the spring bears on the snubber body. The spring action normally tends to move the active end of the spring in a counter clockwise direction, limited only by contact with the snubber, or by contact with the limiting pin 46. Actual movement of the snubber is primarily induced by frictional contact between the film and the snubbing cap 38, but the spring may be provided, as in this particular embodiment, to aid in moving the snubber from the inoperative to the operative position. Snubber movement in both rotational directions may be limited by contact with the active end 49 of the spring 45. A positive stop is necessary for adequate snubbing in the operative position, and may be supplied by the contact between the limiting pin 46, the active end 49 of the spring, and the snubber body itself. In FIGURE 4, the snubber is shown in its inoperative position, offering minimum resistance to film transport as the film is guided over the snubber mounting block.

A further extension of my invention is illustrated in FIGURE 6, whereby I propose using a single wire spring 55 to provide the restorative force to both snubbers, and to provide a spring force for the film pressure shoe 24. Both snubbers 33, 34 and the pressure shoe 24 may be carried by a single mounting block 56. This system has obvious economic benefits through reduced tooling and production costs, in that a single spring may be used to accomplish the functions formerly requiring three separate springs, and a single mounting block may be used to carry both snubbers 33 and 34, and the film pressure shoe 24, where three separate blocks had been formerly required.

These systems thus described represent illustrative embodiments of my invention. Modifications and variations of these illustrated systems may be made without departing from the spirit and scope of my invention.

I claim as my invention:

1. In a reversible film container, adapted for use in combination with a motion picture camera, using film of a size such that only one longitudinal half of the film is exposed at a particular time, said container including a casing physically co-operable with said camera in a first position as to one longitudinal half of the film and in a reversed position as to the second longitudinal half of the film, two adjacent spindle means that alternately serve as film supply and film take-up means respectively, and means in the container co-operable with means in the camera to form a film exposure gate positioned in the film path between said spindle means, the improvement comprising: a pair of movable engaging members, means mounting said engaging members to the casing for selective movement between an active position, whereby contact with film causes a snubbing action on the film, and an inactive position, whereby the film does not normally engage said movable members, one of said film engaging members being located between the film supply spindle and the entrance to the film exposure gate and being moved to said inactive position during film transport, and the other of said film engaging members being located between the exit of the film exposure gate and the film take-up spindle, and being moved to said active position during film transport, whereby reversing the position of the container effects a reversal of the respective positions of both film engaging means.

2. In a reversible film container, adapted for use in combination with a motion picture camera, using film of a size such that only one longitudinal half of the film is exposed at a particular time, said container including a casing physically co-operable with said camera, in a first position as to one longitudinal half of the film and in a reversed position as to the second longitudinal half of the film two adjacent spindle means that alternately serve as film supply and film take-up means respectively, and means in the container co-operable with means in the camera to form a film exposure gate positioned in the film path between said spindle means, the improvement comprising: a pair of movable film engaging members, means mounting said engaging members to the casing for selective movement by means of frictional contact with the moving film, between an active position, whereby contact with the film causes a snubbing action on the film, and an inactive position, whereby film transport movement is not restricted, one of said film engaging members being located between the film supply spindle and the entrance to the film exposure gate and being moved by means of frictional contact with the moving film, to said inactive position during film transport, and the other of said film engaging members being located between the exit of the film exposure gate and the film take-up spindle, and being moved by means of frictional contact with the moving film, to said active position during film transport, whereby reversing the position of the container effects a reversal of the respective positions of both film engaging means.

3. In a reversible film cartridge, adapted for use in combination with a motion picture camera, using conventional double-run motion picture film of which only one longitudinal half of the film is exposed at a particular time, said cartridge including a casing physically co-operable with said camera in a first position as to one longitudinal half of the film and in a reversed position as to the second longitudinal half of the film, two adjacent spindle means that alternately serve as film supply and film take-up means respectively, and a resiliently biased pressure pad, carried by the cartridge casing and positioned between said spindle means, extending through an opening in the casing and co-operable with a fixed exposure aperture plate in the camera to form a film exposure gate, the improvement comprising: a pair of pivotal, film engaging snubbers, each comprising a frictional film contact surface of a resilient frictional material carried by a rigid body member which in turn is carried by, and is selectively pivotable in a mounting block, by means of frictional contact with the moving film, between an active position, wherein contact with film causes a snubbing action on the film, and an inactive position, wherein film transport movement is not restricted, said mounting blocks carried by the casing and respectively positioned in the film path between the film supply spindle and the entrance to the film exposure gate, and between the film exposure gate exit and the film take-up spindle, said snubber positioned between the film supply spindle and the entrance to the film exposure gate being moved by means of frictional contact with the film to said inactive position during film transport, and said snubber positioned between the film exposure gate exit and the film take-up spindle being moved by means of frictional contact with the film to said active position during film transport, whereby reversing the position of the container effects a reversal of the respective positions of both snubbers.

References Cited by the Examiner

UNITED STATES PATENTS

| 2,119,375 | 5/1938 | Wurm | 352—72 |
| 2,173,996 | 9/1939 | Becker | 242—71.2 |
| 3,001,440 | 9/1961 | Foster | 242—71.2 |
| 3,065,890 | 11/1962 | Fox | 352—159 X |

STANLEY N. GILREATH, *Primary Examiner.*

GEORGE F. MAUTZ, *Examiner.*